Nov. 13, 1962 M. C. NEUMAN 3,063,428
BLAST DOOR OPERATING PISTON WITH BUILT-IN CONTROL
Original Filed Oct. 22, 1959 8 Sheets-Sheet 1

INVENTOR
Milton C. Neuman

BY Q. Barton Warner
Walter G. Finch
ATTORNEYS

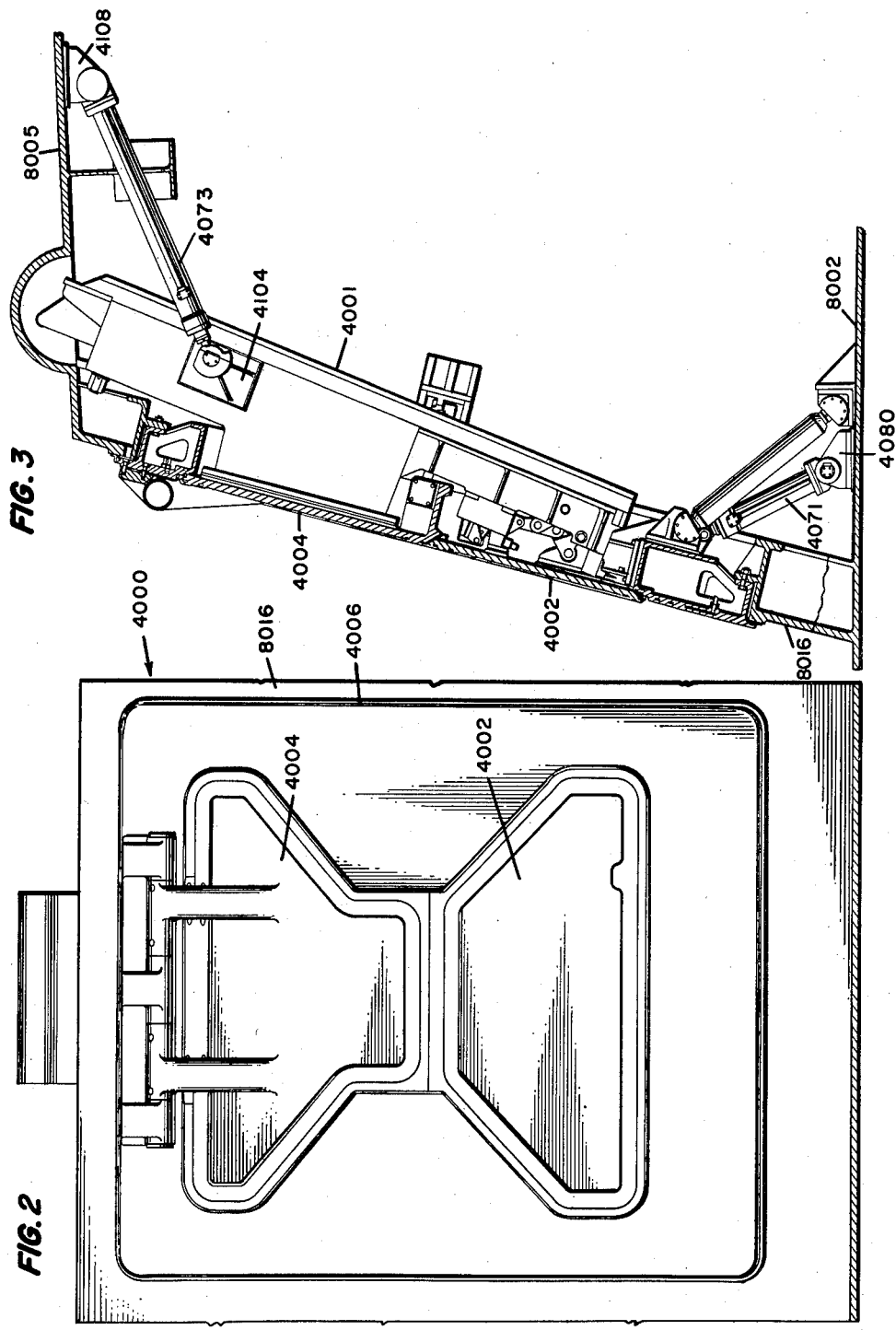

Nov. 13, 1962   M. C. NEUMAN   3,063,428
BLAST DOOR OPERATING PISTON WITH BUILT-IN CONTROL
Original Filed Oct. 22, 1959   8 Sheets-Sheet 3
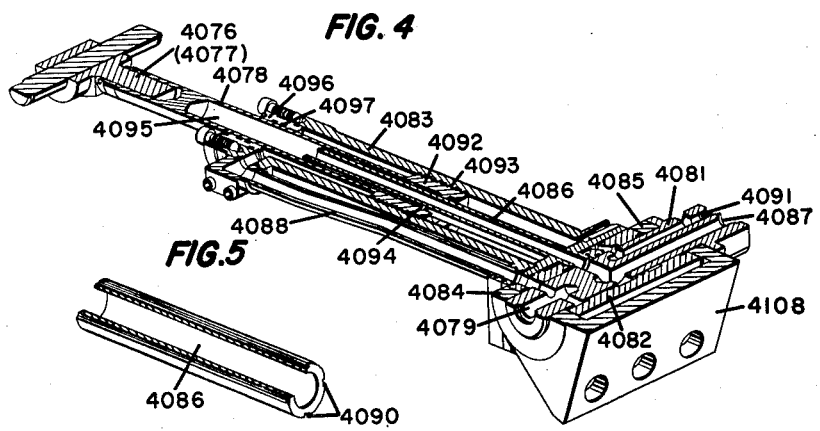

Nov. 13, 1962 M. C. NEUMAN 3,063,428
BLAST DOOR OPERATING PISTON WITH BUILT-IN CONTROL
Original Filed Oct. 22, 1959 8 Sheets-Sheet 5

Nov. 13, 1962 M. C. NEUMAN 3,063,428
BLAST DOOR OPERATING PISTON WITH BUILT-IN CONTROL
Original Filed Oct. 22, 1959 8 Sheets-Sheet 7

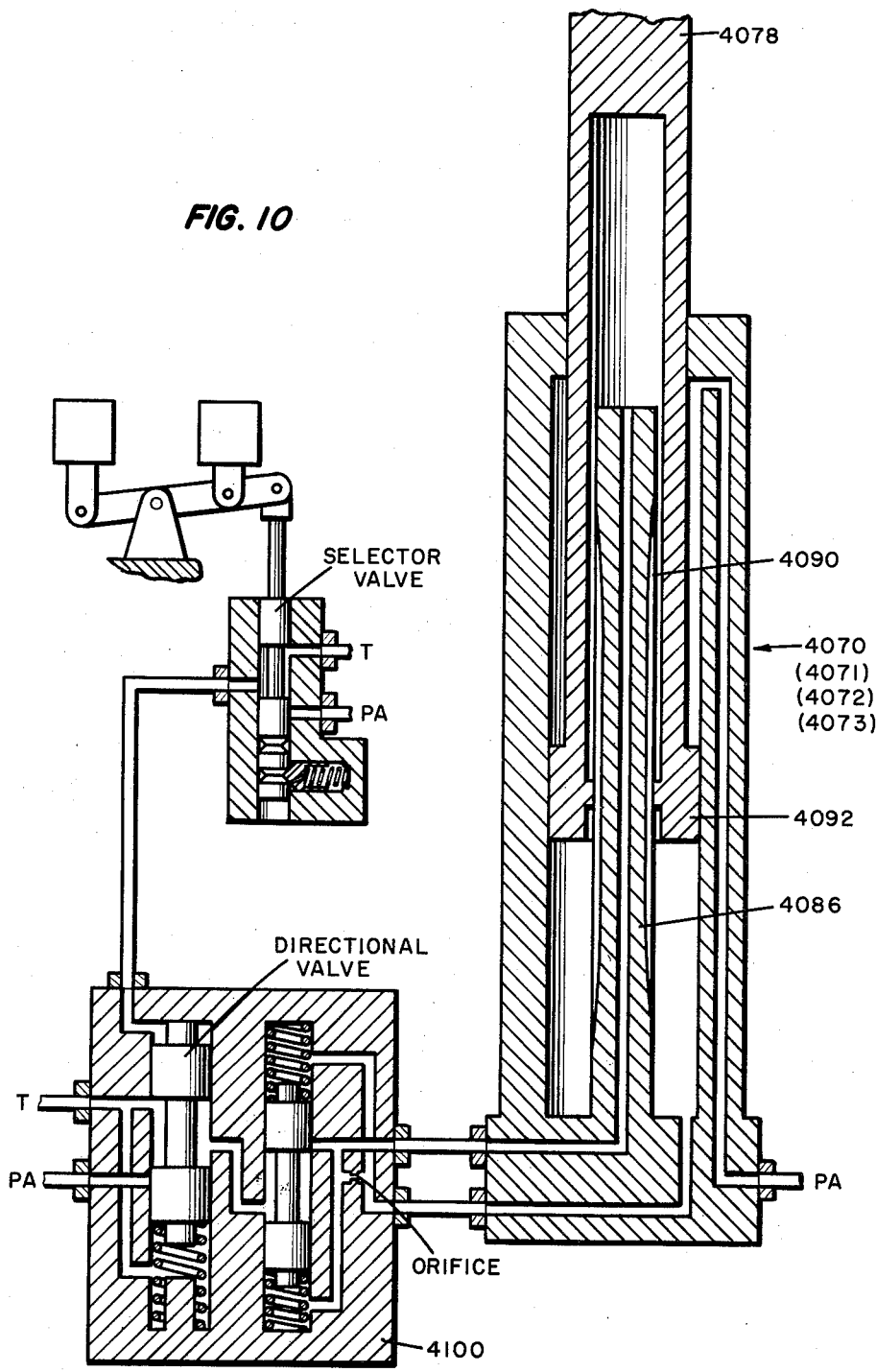

United States Patent Office 3,063,428
Patented Nov. 13, 1962

3,063,428
BLAST DOOR OPERATING PISTON WITH
BUILT-IN CONTROL
Milton C. Neuman, Champlin, Minn., assignor, by mesne assignments, to the United States of America as represented by the Secretary of the Navy
Original application Oct. 22, 1959, Ser. No. 848,163. Divided and this application Jan. 29, 1960, Ser. No. 5,575
6 Claims. (Cl. 121—46)

This invention relates generally to expansible chamber motors, and more particularly it pertains to hydraulically operated cylinder door openers. This invention finds particularly utility in connection with the operation of blast doors used in guided missile launching systems. The present application is a division of U.S. Patent Application, Serial Number 848,163, filed on October 22, 1959, by Myron J. Bauer et al. for "Guided Missile Launching System."

Heavy doors, such as used in the previously mentioned guided missile launching system, are of necessity power operated. In automatic systems of which such doors form a part, gentle, yet effective closing and terminal opening operation thereof are required to prevent damage. Yet for best efficiency, such as required in modern warfare, speed of operation is essential.

An automatic system employing heavy blast doors on shipboard and of which the present invention forms a part is described in the application mentioned above.

Accordingly, it is an object of this present invention to provide a door operating power piston having an operating rate dependent upon the degree of extension thereof.

Another object of this invention is to provide a pivoted power piston having an adjustable rod end pivot pin.

And another object of this invention is to provide a pivoted power piston having fluid conducting passages in its pivotal mounting base.

These and other objects and attendant advantages of this invention will become more readily apparent and understood from the accompanying specification and drawings in which:

FIG. 2 is a front elevation of the pair of upper and lower blast doors of FIG. 1 in a closed position;

FIG. 3 is a side elevation, with parts removed, of the upper and lower blast doors in a closed position, and showing the power pistons incorporating features of the invention;

FIG. 4 is a dimetric cutaway view, partly in cross section, of a power piston assembly;

FIG. 5 is a dimetric cutaway view, partly in cross section, of a control rod;

FIG. 10 is a schematic of the power piston assembly of FIGS. 8 and 9 and control therefor with the piston retracting.

Figure 1:
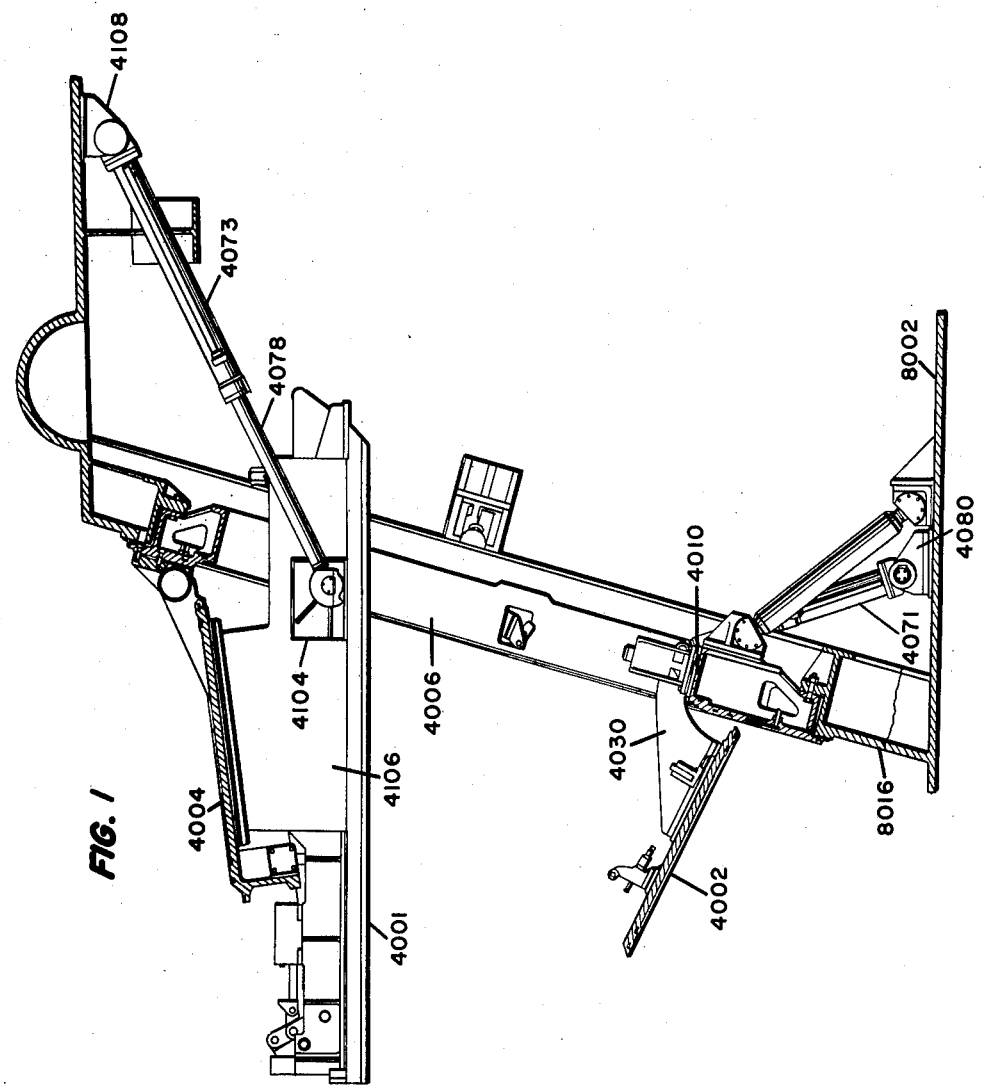
FIG. 1 is a side elevation, with parts removed, of upper and lower blast doors of a guided missile launching system in an opened position.
Figure 7:
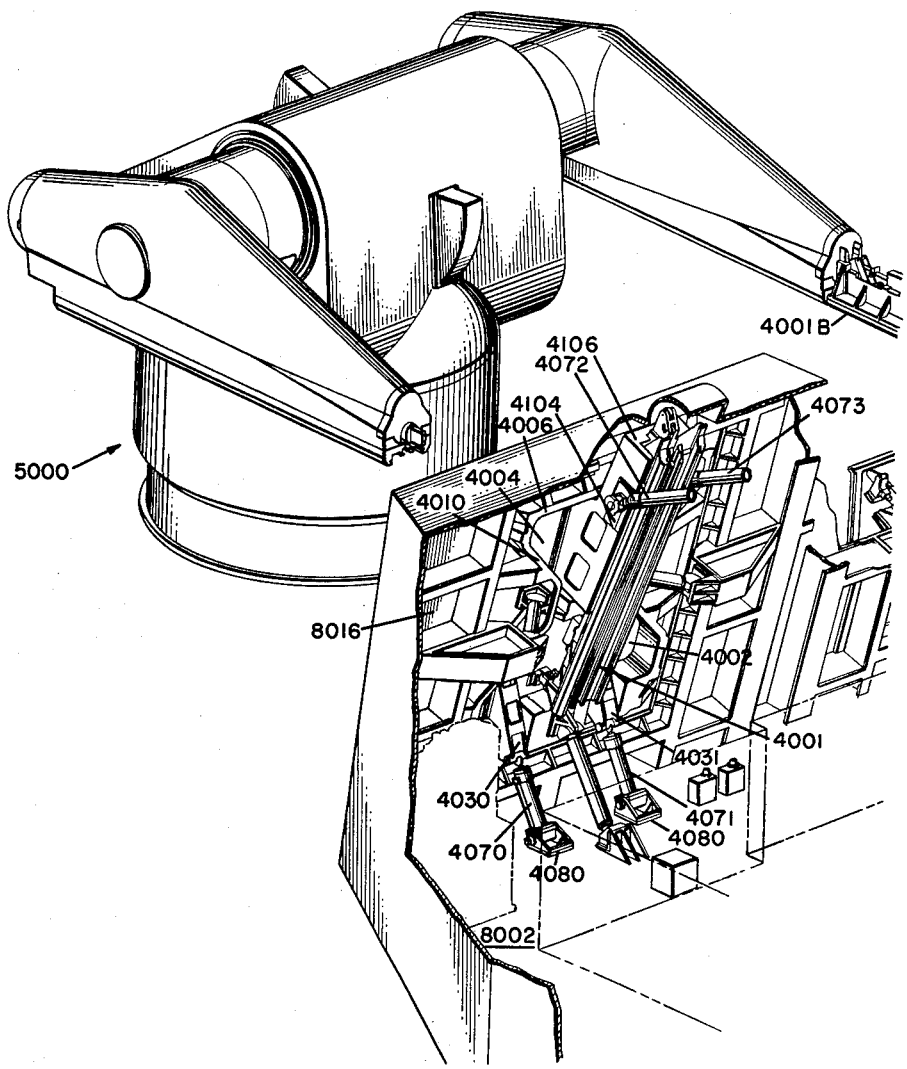
FIG. 7 is a dimetric view of a launcher, span track, and blast door components.

Referring now to FIGS. 1, 2, and 7 of the drawings, there is shown generally a blast door 4000 for passing weapon articles, such as missile weapons, through a ship bulkhead or deckhouse face 8016. The blast door 4000 comprises a frame 4006, an upper door 4004, a lower door 4002, and a tramway span track assembly 4001.

The span track assembly 4001 is secured to the inner face of the upper door 4004 and it is used, when extended, as shown in FIG. 1, as the rail of a conveyer for the article, such as the missile weapon to a launcher 5000, shown in FIG. 7. The article, in this instance, is a missile weapon having wings and fins located in four positions at substantially 45° to the longitudinal axis thereof and is cruciform in section which explains the hour-glass opening of the doorway.

The upper and lower doors 4004 and 4002, respectively, are hinged at the top and bottom on a horizontal plane so as to overlap slightly when they are closed and thus then tightly seal the doorway against blast and heavy seas.

For this reason and because the upper door 4004 supports the span track assembly 4001, the construction of the doors 4002 and 4004 is massive and must be power operated. The opening and closing speed of both the upper and lower doors 4004 and 4002, respectively, is required to be regulated to maintain a given velocity at a given position, regardless of gravitational forces or motion of the ship. As the lower and upper doors 4002 and 4004 near their fully open or fully closed positions, it is desired that the speed of each gradually be reduced.

Each blast door 4002 and 4004 is opened and closed by two hydraulically operated pistons 4070 and 4071, and 4072 and 4073, respectively, as shown best in FIGS. 1, 3, and 7. The pistons 4070 and 4071, and 4072 and 4073, on both the lower and upper doors 4002 and 4004, respectively, are similar in design and identical in operation, but differ in size and assigned designations. The lower door power pistons 4070 and 4071 for the lower door 4002 are shorter than the two upper door power pistons 4072 and 4073 operating the upper door 4004, as shown in FIGS. 1 and 3, wherein the nearest lower power piston 4070 has been removed for clarity.

As indicated in FIGS. 1 and 3, a pair of mounting brackets 4080 are provided to hold the lower end of the pistons 4070 and 4071. These brackets 4080, in turn, are mounted to the deck 8002 of the vessel. Adjustable links 4076 and 4077 are screwed to the top of the piston rods 4078 of the pistons 4070 and 4071, as shown in FIG. 4, and they are pinned to the outrigged section of a pair of lower door hinges 4030 and 4031, respectively. The right-hand inboard power piston 4073 and the left-hand outboard power piston 4072 open and close the upper blast door 4004.

As shown best in FIG. 1, piston rods 4078 of the upper door power pistons 4072 and 4073 are pinned to brackets 4104 located on each side of a span track support 4106. Piston mounting brackets 4108 are bolted to the interior wall of the overhead 8005 of the aft deckhouse of the ship, as shown in FIG. 3. With the exception of their greater length, the assemblies for the pistons 4072 and 4073 resemble the assemblies for the lower door piston 4070 and 4071 in all significant details.

The principle components of the assembly for each power piston 4070 and 4071 includes the mounting brackets 4080, bracket 4108, a pivot pin 4081, a cylinder block 4082, a cylinder 4083, a control rod 4086, a piston 4092, a sleeve 4096, the adjustable connecting link 4076 (4077), and a pipe assembly 4088, as shown in detail in FIG. 4.

The mounting bracket 4080 is bolted to the deck of the vessel or ship and it anchors the piston 4070 (4071). The pivot pin 4081 is arranged to extend through the bracket 4080 and hold the cylinder block 4082. Suitable hydraulic lines are provided which lead to the piston 4070 (4071) and which are connected to the ends of the pivot pin 4081. Passages are drilled into the ends of the pivot pin 4081 and they lead to annular grooves, which connect with fluid passages in the cylinder block 4082. The flanged end of the pivot pin 4081 is bolted to the mounting bracket 4080.

The cylinder block 4082 is pivotally mounted on the pivot pin 4081. This cylinder block 4082 is fitted between a pair of spaced ears 4084 and 4085 of the mounting bracket 4080. Other piston components, such as the cylinder 4083, the control rod 4086, and the pipe assembly 4088, are bolted to this cylinder block 4082.

The control rod 4086 is essentially a hollow steel rod which extends upwardly from the cylinder block 4082. Control grooves 4090, that is, tapered longitudinal grooves, are cut into the outer surface of the rod 4086, as shown in FIG. 5. The depth of each groove 4090 increases progressively from either end of the rod 4086 toward a point between the ends of the groove. This variation of groove depth acts as a variable orifice, since hydraulic fluid must pass through these grooves 4090 when the blast door 4002 opens or closes.

The piston 4092 is provided with a cylindrical opening therethrough so that it can fit onto the control rod 4086. The larger lower end, or head of the piston 4092, slides in the bore of the cylinder 4083, and it is equipped with small annular grooves 4093, as shown in FIG. 4. The groves 4093 prevent hydraulic slippage from building up more separating force between the piston diameter and the cylinder wall, on one side than the other.

Figure 8:
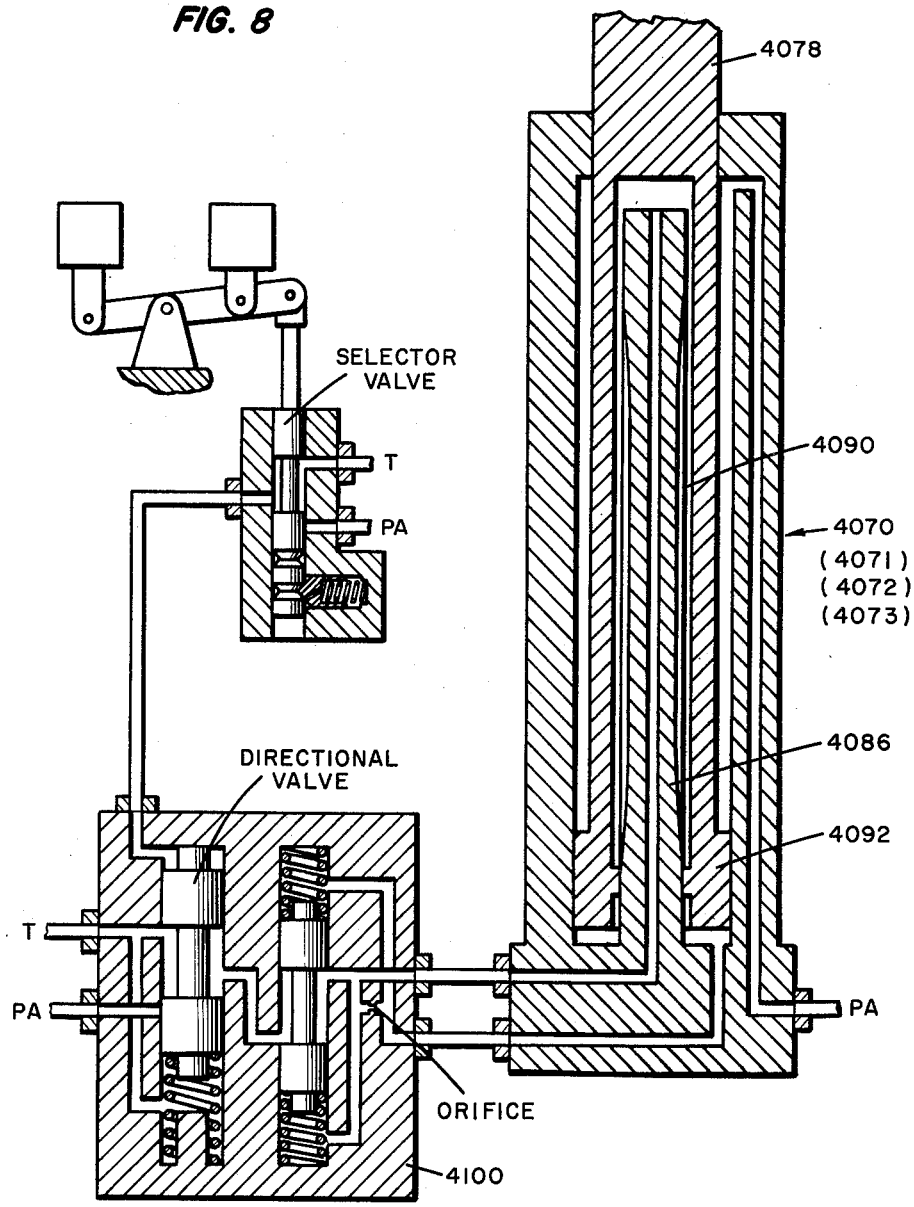
FIG. 8 is a schematic of a power piston assembly and control with the piston retracted.
Figure 9:
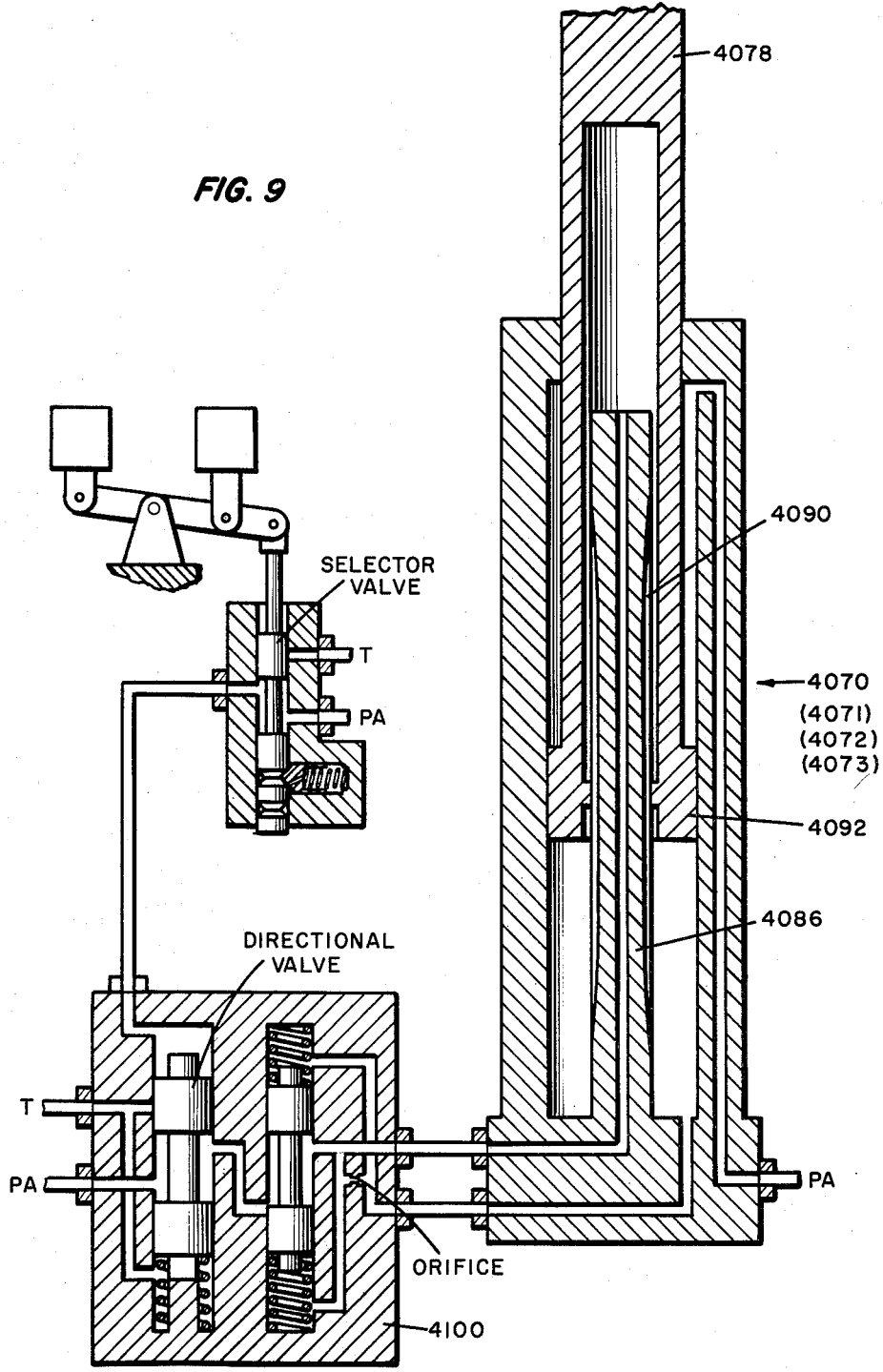
FIG. 9 is a schematic of the power piston assembly of FIG. 8 and control therefor with the piston extending.

In FIGS. 8, 9, and 10, there are schematic diagrams of the basic elements of a door power operating piston, such as 4070, and control therefor, showing the piston 4092 retracted, piston 4092 extending, and piston 4092 retracting, respectively. On the extend stroke of the piston 4092, it is to be noted that the hydraulic fluid must pass through the center of the control rod 4086 back through the control groves 4090 in the control rod 4086 to displace the piston 4092. The grooves 4090 in the rod 4086 are cut similar to a keyway. The variations in the depth of the groove provide a variable size orifice for controlling the velocity of the piston 4092 on the extend and retract strokes. Opposite ends of the groove 4090 are ported to opposite ends of the spring centered metering valve 4100. The valve 4100 meters the flow of hydraulic fluid to maintain a constant pressure drop through the variable orifice regardless of the direction of movement of the piston 4092. The combination of the control grooves 4090 and metering valve 4100 provide specific acceleration, deceleration and velocity rates through repeated cycles independent of the motion of the ship or vessel and the viscosity of the fluid.

FIG. 8 shows that the orifice passage is completely closed when the piston 4092 is fully retracted which is also the condition when the piston is extended. Since it is desirable to have some hitting speed at the stroke extremes, a fixed orifice is provided in the valve block that connects opposite ends of the metering valve 4100. In addition, the orifice location selected provides access for adjustment of the impact velocity by redrilling the orifice hole size.

The directional valves included with the two controls serve two functions. The solenoid selector valves are relatively small in size and each acts as a pilot valve to shift the directional or transfer valve which is proportioned to handle the rather large volume of fluid involved. In addition, it is necessary to sequence the pilot flow and release the securing latches before the operating piston 4092 is subjected to the accumulator pressure.

A flange 4094 on the inside of the head slides on the control rod 4086. This flange 4094 forces the hydraulic fluid to flow through the deceleration grooves 4090 when the piston 4092 is either extending or retracting. The piston rod 4078, which is formed of Monel or similar material, is welded to the head of the piston and it extends from the top of the cylinder 4083. A shallow threaded hole at the upper end of the piston rod 4078 holds the adjustable link 4076 (4077).

The cylinder 4083 is a hollow steel tube in which the piston 4092 slides. The lower end of the cylinder 4083 is bolted to the cylinder block 4082, while the upper end thereof holds the sleeve 4096. The sleeve 4096 is bolted to the top of the cylinder 4083, and it is utilized to guide the piston rod 4078. The sleeve 4096 is equipped with grooves and seals 4097 to prevent leakage of hydraulic fluid.

The previously mentioned pipe assembly 4088 is attached to the outside of the cylinder 4083. This pipe assembly 4088 conducts hydraulic pressure fluid from the cylinder block 4082 to the rod end of the piston 4078. The adjustable link 4076 (4077) screwed into the end of the piston rod 4078 is pinned to the outrigged section of the lower door hinges as has been related. When adjusted, a locknut and a lockring (not shown) secure the link 4076 (4077) in position.

Figure 6:
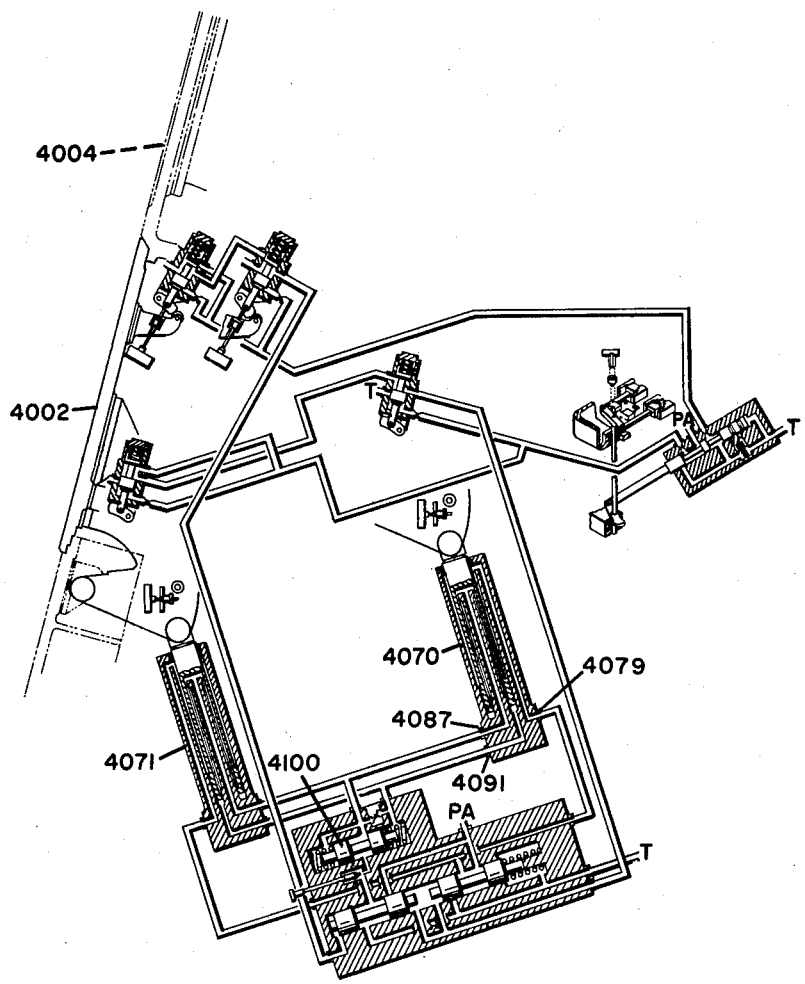
FIG. 6 is a hydraulic schematic of the lower blast door in closed position.

To extend the piston rod 4078, hydraulic pressure fluid is ported from an external metering valve 4100, shown schematically in FIG. 6 to the piston pivot pin 4081 to port 4087, shown in FIG. 4. The hydraulic pressure fluid passes through the control rod 4086 to a piston rod cavity 4095. As the piston 4092 extends, hydraulic pressure fluid passes from the cavity 4095, through the deceleration grooves 4090, to the cylinder 4083 below the face of the piston 4092.

One end of the spring-balanced metering valve 4100 is connected to this lower cylinder area, through a port 4091, as shown in FIGS. 4 and 6, while the other end of valve 4100 is connected to the hydraulic pressure fluid line 4087 leading to the cavity 4095 of the piston rod 4078.

With the piston 4092 in a particular position in the cylinder, the piston velocity is limted to a particular value regardless of the direction in which it is moving. This is accomplished by means of the control grooves 4090 and the metering valve 4100. The metering valve 4100 is held in a centered position by a spring at each end when the pistons are not in motion. When the pistons are in motion, a pressure drop across the control grooves 4090 causes a pressure differential between the two ends of metering valve 4100, moving the valve 4100 from the centered position and throttling the fluid flow through the valve. Any tendency to increase the flow through the control grooves 4090 will increase the pressure drop across the grooves 4090, and thus moving the metering valve 4100 still further from its centered position and increasing the throttling effect. The action of the metering valve 4100 thus limits the pressure drop across the control grooves 4090.

The velocity of the piston 4092 is thus determined by the fluid flow permitted through the control rod grooves, and is a variable function dependent on the extended position of the piston rod 4078 and of the lower door 4002.

As the differential-area piston 4092 extends, hydraulic pressure fluid supplied by the pipe assembly 4088 to the rod end of the piston 4070 (4071) is forced out of the cylinder 4083 and back into the hydraulic pressure system, through a port 4079, shown in FIGS. 4 and 6. This occurs because the hydraulic pressure fluid at the bottom of the piston 4092 acts against a greater area than the hydraulic pressure fluid at the rod end of the piston 4070 (4071).

To retract the piston 4092, the line, which supplied hydraulic pressure fluid to port 4087, is ported to tank. Hydraulic pressure fluid supplied by the pipe assembly 4088 to the top of the cylinder 4083 is then effective against the rod end of the piston 4092. The control grooves 4090 and the metering valve 4100 regulate the flow of fluid to the tank, and again determine the velocity of the piston 4070 (4071).

Obviously many modifications and variations of the present invention are possible in light of the above teachings. It is, therefore, to be understood that within the scope of the appended claims the invention may be practiced otherwise than as specifically described.

What is claimed is:

1. A compound piston arrangement, comprising, a cylinder, variable bypass means spaced from the wall of said cylinder and extending longitudinally from one end of said cylinder and terminating short of the opposite end thereof, a piston arranged about said variable bypass means and within said cylinder, a piston rod connected to said piston and having an axial cavity for receiving said variable bypass means, with the terminal end of said axial cavity constituting a first working area, the end of said piston opposite said piston rod constituting a second working area, means for subjecting either end of said piston to fluid pressure, and means including a control rod centrally positioned in said cylinder, a passageway in said control rod extending through said variable bypass means to its end spaced from the opposite end of said cylinder for introducing a pressure fluid to said first working area, means connected to said first and second working areas to maintain a constant pressure drop through said orifice, said bypass means including an orifice for transferring said fluid from said first working area to said second working area, said orifice being formed by a plurality of grooves progressively increasing in depth to a point and then progressively decreasing in depth for the remainder of its length.

2. A variable velocity compound piston device, comprising, a cylinder having a re-entrant control element, an annular piston arrangement slidably positioned between said control element and cylinder for defining an inside piston working area, a first outside piston working area arranged to co-work with said inside piston working area, and a second outside piston working area; fluid conducting passages for subjecting said inside piston working area and said first outside piston working area to a first pressurized fluid, with said second outside piston working area being subjected to a second pressurized fluid of an equal or greater magnitude than said first pressurized fluid, said control element having at least one variable orifice therein connecting said inside piston working area to said first outside piston working area to transfer fluid from said inside piston working area to said first outside piston working area at a predetermined rate corresponding to the desired movement of said annular arrangement of said device, said orifice in said control element consisting of a plurality of grooves formed in the surface thereof which increase progressively in depth from either end to a point intermediate the ends of said grooves, said grooves terminating short of the ends of said control element and means connected to said passages of said inside piston working area and said first outside piston working area for maintaining a constant pressure drop through said variable orifice whereby a predetermined velocity of said annular arrangement of said device is obtained.

3. In combination with an object to be moved, a variable velocity compound piston device consisting of a cylinder having a re-entrant control element, an annular piston arrangement slidably positioned between said control element and cylinder and connected to said object to be moved and defining an inside piston working area and a first outside piston working area arranged to co-work with said inside piston working area, and a second outside piston working area; fluid conducting passages for subjecting said inside piston working area and said first outside piston working area to a first pressurized fluid, with said second outside piston working area being subjected to a second pressurized fluid of an equal or greater magnitude than said first pressurized fluid, said control element having at least one variable orifice therein connecting said inside piston working area to said first outside piston working area for transferring fluid from said inside piston working area to said first outside piston working area at a predetermined rate corresponding to the desired movement of said annular arrangement of said device, means connected to said inside piston working area and said first outside piston working area for maintaining a constant pressure drop through said variable orifice, whereby a predetermined velocity of said piston is obtained.

4. In the arrangement recited in claim 3, wherein said orifice in said control element consists of a groove formed in the surface thereof which increases progressively in area from either end thereof to the center of said groove.

5. A power piston arrangement, comprising, a cylinder, means including a control rod centrally spaced from the wall of said cylinder and extending longitudinally from one end of said cylinder and terminating short of the opposite end thereof, a piston arranged concentrically about said control rod and within said cylinder, said control rod having at least one longitudinally arranged groove of varying depth formed in its outer surface but terminating short of the ends thereof, a piston rod connected to said piston and having an axial cavity to receive said control rod, means for subjecting either end of said piston to fluid pressure, and means including a passageway extending through said control rod to its end spaced from the opposite end of said cylinder for fluid flow between said axial cavity and the end of the cylinder opposite said piston rod, means connected to both ends of said piston for maintaining a constant pressure drop through said variable orifice, whereby a predetermined velocity of said piston is obtained.

6. A piston arrangement, comprising, a cylinder, variable bypass means spaced from the wall of said cylinder and extending longitudinally from one end of said cylinder and terminating short of the opposite end thereof, a piston arranged about variable bypass means and within said cylinder to divide it into two sections, a piston rod connected to said piston and having an axial cavity positioned to receive said variable bypass means, said bypass means having at least one variable orifice to transfer fluid serially from said axial cavity to the cylinder section opposite said piston rod end thereof, means for subjecting either end of said piston to fluid pressure, and means including a passageway extending through said variable bypass means to said axial cavity for flow or fluid therein and back through said variable orifice to said cylinder section opposite said piston rod end, means connected to both ends of said piston for maintaining a constant pressure drop through said variable orifice, whereby a predetermined velocity of said piston is obtained.

References Cited in the file of this patent

UNITED STATES PATENTS

| | | |
|---|---|---|
| 635,848 | Dutton | Oct. 31, 1899 |
| 778,168 | Bramwell | Dec. 20, 1904 |
| 2,049,335 | Stephens | July 28, 1936 |
| 2,317,563 | Tucker | Apr. 27, 1943 |
| 2,491,551 | Cross | Dec. 20, 1949 |
| 2,928,379 | Preciado | Mar. 15, 1960 |
| 2,932,281 | Moskowitz | Apr. 12, 1960 |